United States Patent [19]
Roman

[11] 3,907,790
[45] Sept. 23, 1975

[54] TETRAHYDRO-2-(NITROMETHYLENE)-2H-1,3-OXAZINES

[75] Inventor: Steven A. Roman, Oakdale, Calif.

[73] Assignee: Shell Oil Company, Houston, Tex.

[22] Filed: Aug. 30, 1974

[21] Appl. No.: 502,115

[52] U.S. Cl.................................. 260/244; 424/248
[51] Int. Cl.².............C07D 265/00; C07D 273/00; C07D 295/00
[58] Field of Search..................... 260/244; 424/248

[56] References Cited
UNITED STATES PATENTS

| | | | |
|---|---|---|---|
| 3,373,159 | 3/1968 | Martin et al. | 260/244 R |
| 3,509,235 | 4/1970 | Riemhofer et al. | 260/244 R |

Primary Examiner—Albert T. Meyers
Assistant Examiner—D. W. Robinson

[57] ABSTRACT

Novel insecticidal tetrahydro-2-(nitromethylene)-2H-1,3-oxazines.

3 Claims, No Drawings

TETRAHYDRO-2-(NITROMETHYLENE)-2H-1,3-OXAZINES

DESCRIPTION OF THE INVENTION

It has been found that useful insecticidal activity is possessed by certain tetrahydro-2-(nitromethylene)-2H-1,3-oxazines of the formula:

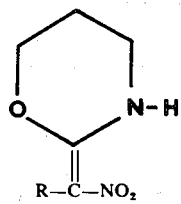

wherein R is hydrogen, middle halogen (i.e., bromine or chlorine) or methoxycarbonyl.

The preparation of these compounds is illustrated in the following examples, demonstrating the synthesis of species wherein R is hydrogen, bromine and methoxycarbonyl, respectively. The species wherein R is chlorine can be prepared by direct chlorination of the R is hydrogen species with chlorine in a manner like that shown for the R is bromine species. Alternatively, the R is chlorine species can be prepared by teating the R is hydrogen species with a chlorinating agent in which the chlorine has a positive character, such as N-chloronsuccinimide or tertiary-butyl hypochlorite at about room temperature or below in a lower chloroalkane as solvent or liquid reaction medium.

In the following examples, the identity of the product and of any intermediate employed, was confirmed by elemental analysis, and by infrared and nuclear magnetic resonance spectrum analyses.

EXAMPLE 1

Tetrahydro-2-(nitromethylene)-2H-1,3-oxazine (1)

Ethyl nitro (tetrahydro-2H-1,3-oxazin-2-ylidene)-acetate (1A)

6.55 g of 5,6-dihydro-2-(methylthio)-4H-1,3-oxazine (Clapp et al, J. Heterocyclic Chemistry, 5, 107(1968)), was added over a 15 minute period to a stirred mixture of 10.0 g of ethyl nitroacetate and a catalytic amount of zinc chloride held at 110°. The mixture then was stirred at that temperature for an additional 30 minutes. The mixture then was cooled and triturated with ether to give a solid, which on recrystallization from ethanol gave 1A, as a white solid, m.p.: 128°–129°.

1

A mixture of 1.75 g of 1A and 2.55 g of barium hydroxide octahydrate in 50 ml of water was stirred at room temperature. After 3 hours, an additional 2.55 grams of barium hydroxide octahydrate was added to the stirred mixture, and 30 minutes later, gaseous carbon dioxide was bubbled into the mixture until the mixture was neutral to pH paper. The mixture was filtered. Liquid in the filtrate was evaporated under reduced pressure to leave a solid residue, which was dissolved in methylene chloride. The solution was dried ($MgSO_4$) and stripped of solvent to give 1, as a white powder, m.p.: 132°–133°.

EXAMPLE 2

Tetrahydro-2-(bromonitromethylene)-2H-1,3-oxazine (2)

1.6 g of bromine in 5 ml of methylene chloride was added dropwise to a stirred solution of 1.4 g of 1 in 10 ml of water at 0°C. After the addition was complete, the mixture was extracted with methylene chloride. The combined extracts were washed with water and dried ($MgSO_4$), and stripped of solvent to give 2, as a pale yellow solid, m.p.: 152°, with decomposition.

EXAMPLE 3

Methyl nitro (tetrahydro-2H-1,3-oxazin-2ylidene)-acetate (3)

A mixture of 25 g of 5,6-dihydro-2-(methylthio)-4H-1,3-oxazine, 25 g of methyl nitroacetate and a catalytic amount of zinc chloride was heated to 95° over one hour and maintained at that temperature for an additional hour. The mixture then was cooled, and triturated with ether to effect crystallization. The solid was recrystallized from ethanol to give 3, as a yellow solid, m.p.: 132°–133°.

The compounds of this invention exhibit useful insecticidal activity, being of particular interest for control of the larvae "caterpillar" or "worm" forms of insects of the genus Heliothis, such as *H. zea* (corn earworm), cotton bollworm, tomato fruitworm), *H. virescens* (tobacco budworm); the genus Agrotis, such as *A. ipsilon* (black cutworm); the genus Trichoplusia, such as *T. ni* (cabbage looper), and the genus Spodoptera, such as *S. littoralis* (Egyptian cotton leafworm). Two are also of interest for controlling houseflies and aphids. In tests that have been conducted all three compounds have exhibited low, or no, toxicity to other insects such as the 2-spotted spider mite and mosquito larva. Two act very rapidly, providing "quick knock-down" of insects, in some cases even though the compound is not very toxic to the insects.

Activity of the compounds of this invention with respect to insects was determined by using standardized test methods to establish the $LC_{50}$ dosage (in milligrams of test compound per 100 milliliters of solvent or liquid carrier required in the solution or suspension of test compound used) that was required to kill 50% of the test insects. The test insects were the housefly, corn earworm, mosquito, pea aphid and 2-spotted spider mite, and in some cases, the black cutworm.

All of the compounds 1A through 3 were found to be inactive or but slightly active with respect to the mites and mosquito larvae. With respect to the corn earworm all three compounds were found to be active. With respect to the pea aphid and housefly, compounds 1 and 2 were found to be active.

In the course of these tests it was not noted that compounds 1 and 2 acted very quickly on pea aphids and corn earworms.

The invention includes within its scope insecticidal compositions comprising an adjuvant — that is, a carrier, optionally a surface-active agent — and, as active ingredient, at least one insecticide of this invention. Likewise the invention includes also a method of combatting insect pests at a locus which comprises applying to the locus an effective amount of at least one insecticide of the invention.

The term "carrier" as used herein means a material, which may be inorganic or organic and of synthetic or natural origin with which the active compound is mixed or formulated to facilitate its application to the plant, seed, soil and other object to be treated, or its storage, transport or handling. The carrier may be a solid or a liquid.

Suitable solid carriers may be natural and synthetic clays and silicates, for example, natural silicas such as diatomaceous earths; magnesium silicates, for example, talcs; magnesium aluminum silicates, for example, attapulgites and vermiculites; aluminum silicates, for example, kaolinites, montmorillonites and micas; calcium carbonate; calcium sulfate; synthetic hydrated silicon oxides and synthetic calcium or aluminum silicates; elements such as for example, carbon and sulfur; natural and synthetic resins such as, for example, coumarone resins, polyvinyl chloride and styrene polymers and copolymers; solid polychlorophenols; bitumen, waxes such as beeswax, paraffin wax, and chlorinated mineral waxes; degradable organic solids, such as ground corn cobs and walnut shells; and solid fertilizers, for example, super-phosphates.

Suitable liquid carriers include solvents for the compounds of this invention and liquids in which the toxicant is insoluble or only slightly soluble.

Examples of such solvents and liquid carriers generally are water, alcohols, for example, isopropyl alcohol, ketones, such as acetone, methyl ethyl ketone, methyl isobutyl ketone and cyclohexanone; ethers; aromatic hydrocarbons such as benzen, toluene and xylene; petroleum fractions, such as kerosene, light mineral oils, chlorinated hydrocarbons, such as carbon tetrachloride, perchlorethylene, trichloroethane, including liquefied normally vaporous gaseous compounds. Mixtures of different liquids are often suitable.

If used, the surface-active agent may be an emulsifying agent or a dispersing agent or a wetting agent. It may be nonionic or ionic. Surface-active agents usually applied in formulating pesticides may be used. Examples of such surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; fatty acid salts of low molecular weight, mono-, di- and trialkyl-amines; condensates of these with ethylene oxide and/or propylene oxide; condensation products of fatty alcohols or alkyl phenols, for example, p-octylphenol or p-octylcresol, with ethylene oxide and/or propylene oxide; sulfates or sulfonates of these condensation products; alkali or alkaline earth metal salts, preferably sodium salts, of sulfuric or sulfonic acids esters containing at least 10 carbon atoms in the molecule, for example, sodium lauryl sulfate, sodium secondary alkyl sulfates, sodium salts of sulfonated castor oil, and sodium alkyaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates or aerosols. Encapsulated formulations and controlled release formulations also are contemplated, as are bait formulations. Wettable powders are usually compounded to contain 25, 50 or 75%w of toxicant and usually contain, in addition to solid carrier, 3–10%w of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10%w of toxicant. Granules may be manufactured by agglomeration or impregnation techniques. Generally, granules will contaian ½–25%w toxicant and 0–10%w of additives such as stabilizers, slow release modifiers and binding agents. Emulsifiable concentrates usually contain, in addition to the solvent, and when necessary, co-solvent, 10–50%w/v toxicant, 2–20%w/v emulsifiers and 0–20%w/v of appropriate additives such as stabilizers, penetrants and corrosion inhibitors. Suspension concentrates are compounded so as to obtain a stable, non-sedimenting, flowable product and usually contain 10–75%w toxicant, 0–5%w of dispersing agents, 0.1–10%w of suspending agents such as protective colloids and thixotropic agents, 0–10%w of appropriate additives such as defoamers, corrosion inhibitors, stabilizers, penetrants and stickers, and as carrier, water or an organic liquid in which the toxicant is substantially insoluble; certain organic additives or inorganic salts may be dissolved in the carrier to assist in preventing sedimentation or as antifreeze agents for water.

Aqueous dispersions and emulsions, for example, compositions obtained by diluting a wettable powder or an emulsifiable concentrate according to the invention with water, also lie within the scope of the present invention.

The compositions of the invention may also contain other ingredients, for example, other compounds possessing pesticidal, herbicidal or fungicidal properties, or attractants, such as pheromones, attractive food ingredients, and the like, for use in baits and trap formulations.

These compositions are applied in sufficient amount to supply the effective dosage of toxicant at the locus to be protected. This dosage is dependent upon many factors, including the carrier employed, the method and conditions of application, whether the formulation is present at the locus in the form of an aerosol, or as a film, or as discrete particles, the thickness of film or size of particles, the insect species to be controlled and the like, proper consideration and resolution of these factors to provide the necessary dosage of active material at the locus being within the skill of those versed in the art. In general, however, the effective dosage of toxicants of this invention at the locus to be protected — i.e. the dosage to which the insect contacts — is of the order of 0.001% to 0.5% based on the total weight of the formulation, though under some circumstances the effective concentration will be as little as 0.001% or as much as 2%, on the same basis.

I claim as my invention:
1. A compound of the formula
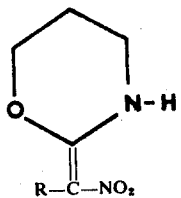
wherein R is hydrogen, chloro, bromo or —C(O)OCH₃.
2. A compound according to claim 1 wherein R is hydrogen.
3. A compound according to claim 1 wherein R is bromine.
* * * * *